(12) United States Patent
Scherman et al.

(10) Patent No.: US 9,795,073 B2
(45) Date of Patent: Oct. 24, 2017

(54) FLOTATION FOR AGRICULTURAL IMPLEMENTS

(71) Applicant: Bourgault Industries Ltd., St. Brieux (CA)

(72) Inventors: Scott Scherman, St. Brieux (CA); Devin Lung, St. Brieux (CA)

(73) Assignee: Bourgault Industries Ltd., St. Brieux, SK (CA)

( * ) Notice: Subject to any disclaimer, the term of this patent is extended or adjusted under 35 U.S.C. 154(b) by 83 days.

(21) Appl. No.: 14/992,454

(22) Filed: Jan. 11, 2016

(65) Prior Publication Data

US 2016/0113190 A1    Apr. 28, 2016

Related U.S. Application Data

(62) Division of application No. 14/862,733, filed on Sep. 23, 2015, which is a division of application No. 13/793,214, filed on Mar. 11, 2013, now abandoned.

(30) Foreign Application Priority Data

Mar. 30, 2012 (CA) ..................... 2772865

(51) Int. Cl.
*A01B 69/00* (2006.01)
*A01C 7/20* (2006.01)
*A01B 69/06* (2006.01)

(52) U.S. Cl.
CPC .......... *A01B 69/003* (2013.01); *A01B 69/004* (2013.01); *A01B 69/005* (2013.01); *A01C 7/208* (2013.01)

(58) Field of Classification Search
CPC ... A01B 69/003; A01B 69/004; A01B 69/005; A01B 69/006; B62D 13/025; B62D 13/04
(Continued)

(56) References Cited

U.S. PATENT DOCUMENTS 2,096,057 A    10/1937 Neighbour
2,930,631 A  *  3/1960 Voorhees, Sr. ......... B62D 13/04
                                                  180/439
(Continued)

FOREIGN PATENT DOCUMENTS

CA    2645522 A1    6/2010
CA    2772865 A1    9/2013
(Continued)

OTHER PUBLICATIONS

Horsch, Pronto 8 DC PPF, Spare Parts List, Jun. 2010, pp. 1-8, 9 pgs.

(Continued)

*Primary Examiner* — Matthew D. Troutman (74) *Attorney, Agent, or Firm* — Frost Brown Todd LLC (57) ABSTRACT

An agricultural implement has front flotation wheels with a significantly increased diameter, increasing flotation and improving rolling characteristics, especially in soft soil conditions. The implement has a frame supported on front and rear wheels. Front flotation wheels are pivotally mounted to the frame about vertical axes. A hitch tongue is pivotally attached to the frame about a vertical hitch pivot axis. A wheel control mechanism connects the front flotation wheels to the hitch tongue, and is configured such that when the hitch tongue is in a neutral position the front flotation wheels roll in the operating direction, and pivoting the hitch tongue causes the front flotation wheels to pivot in the same direction.

6 Claims, 9 Drawing Sheets

(58) Field of Classification Search
USPC .............. 172/278, 282, 284, 286, 288, 677; 280/444, 445
See application file for complete search history.

(56) References Cited

U.S. PATENT DOCUMENTS

| | | | |
|---|---|---|---|
| 3,012,638 A | 12/1961 | Morlik | |
| 3,311,387 A | 3/1967 | Klemm et al. | |
| 4,221,398 A * | 9/1980 | Pautrat | B60P 3/064 280/444 |
| 4,579,362 A | 4/1986 | Kirkpatrick | |
| 4,720,119 A | 1/1988 | Ritter | |
| 5,006,032 A * | 4/1991 | Riedl | B65D 90/18 280/418.1 |
| 5,244,226 A * | 9/1993 | Bergh | B62D 13/04 280/426 |
| 5,340,142 A | 8/1994 | Kuhns | |
| 5,570,754 A * | 11/1996 | Stimson | A01B 51/026 180/167 |
| 6,035,943 A * | 3/2000 | Gerein | A01B 63/22 172/328 |
| 6,360,516 B1 * | 3/2002 | Harkcom | A01D 67/005 56/15.5 |
| 6,443,079 B1 | 9/2002 | Horsch | |
| 6,631,916 B1 * | 10/2003 | Miller | A01B 69/004 172/279 |
| 7,461,854 B2 | 12/2008 | Friggstad | |
| 8,042,826 B1 | 10/2011 | Ramsdell | |
| 8,271,164 B2 * | 9/2012 | Melanson | A01B 69/004 111/14 |
| 9,004,519 B1 * | 4/2015 | Beech | B62D 13/04 280/442 |
| 9,114,832 B2 | 8/2015 | Wang et al. | |
| 2004/0124605 A1 * | 7/2004 | McClure | A01B 69/004 280/456.1 |
| 2006/0070757 A1 * | 4/2006 | Posselius | A01B 61/02 172/677 |
| 2007/0108730 A1 * | 5/2007 | Friggstad | A01B 69/006 280/444 |
| 2007/0145714 A1 * | 6/2007 | Friggstad | A01B 69/006 280/444 |
| 2009/0101371 A1 * | 4/2009 | Melanson | A01B 69/004 172/6 |
| 2010/0198444 A1 * | 8/2010 | Jensen | A01B 69/006 701/26 |
| 2011/0112721 A1 | 5/2011 | Wang et al. | |
| 2013/0255974 A1 | 10/2013 | Scherman et al. | |
| 2016/0007521 A1 | 1/2016 | Scherman et al. | |

FOREIGN PATENT DOCUMENTS

| | | |
|---|---|---|
| DE | 195 31 172 A1 | 3/1996 |
| DE | 10 2006 044 204 A1 | 3/2008 |
| FR | 2034151 A1 | 12/1970 |

OTHER PUBLICATIONS

Third-Party Submission Under 35 U.S.C. § 122(e) and 37 C.F.R. § 1.290, dated Jul. 14, 2016 U.S. Appl. No. 14/862,733, 12 pgs.
Horsch Seed Wagon, SW 3500 SD / 5000 S / 7000 SD, Operating Instructions, Jul. 2005, 56 pgs.

* cited by examiner

FLOTATION FOR AGRICULTURAL IMPLEMENTS

PRIORITY

This application is a divisional of and claims priority to and benefit of U.S. application Ser. No. 14/862,733, filed Sep. 23, 2015, which is a divisional of and claims priority to and benefit of U.S. application Ser. No. 13/793,214, filed Mar. 11, 2013, which claims priority to and benefit of Canadian Application Ser. No. 2,772,865, filed Mar. 30, 2012, the contents of which are all incorporated herein in their entirety for all purposes.

BACKGROUND

This disclosure relates to the field of agricultural implements and in particular such implements with increased flotation and resistance to sinking into soft soil.

A common problem that farmers can experience at seeding time is the inability to seed their crops because excessive soil moisture makes the fields unable to support the seeding equipment, typically due to excessive or untimely rainfall. Sometimes as well heavy snow cover produces a lot of moisture which must either run off the fields, be absorbed by the soil or evaporate. A late, cool spring can slow the soil drying process considerably. Unfortunately, for maximizing crop yields and crop quality and also minimizing the chances of crop damage or complete crop losses for spring seeded crops, it is necessary for farmers to seed their crops within the finite window of time indicated as acceptable by past experience.

Seeding too late, especially in northern agricultural areas, exposes the crop to the risk of frost before the crop matures. This risk is recognized in some crop insurance regimes where crops must be seeded before a specified date in order to qualify for crop insurance. As farm sizes, crop input costs, land costs, and the like increase, the negative consequences for failing to seed a crop increase as well.

Agricultural air seeders are typically used to place seed and fertilizer in the soil to plant a crop. Such air seeders typically include a frame mounted on wheels for movement along the ground, and furrow openers mounted to the frame and spaced evenly across the width of the frame so that furrows and thus seed rows are evenly spaced across the field. The frame includes a hitch extending forward from the front end thereof and the drawbar of a towing tractor is attached to the front end of the hitch by a pin, such that the frame is pivotally attached to the drawbar about a vertical pivot axis provided by the pin.

To provide even emergence of the crop plants, and to maximize yields, it is desirable to place the seeds at a consistent depth beneath the soil surface. One common design to accomplish this is to provide front and rear wheels along corresponding front and rear edges of the frame, so that the front and rear edges are then at a distance above the ground that is substantially the same regardless of ups and downs in the field terrain and is thus kept level. The furrow openers are located between the front and rear wheels.

In air seeders with furrow openers mounted directly to the drill frame, the furrow openers extend the same distance downward from the frame so that the depth to which each furrow opener penetrates the soil is substantially the same, and is controlled by moving the front and rear wheels up and down with respect to the frame.

In air seeders with independent ground following openers, each furrow opener is independently mounted on an arm with a ground following wheel, and a hydraulic cylinder exerts a downward bias force between the frame and the arm that pushes the furrow opener into the soil, and forces the ground following wheel against the soil behind the furrow opener to pack the soil over the seed. The relative position of the furrow opener and ground following wheel is adjusted to substantially control the penetration depth. The hydraulic cylinders also raise the arms to transport and lower them for field work.

Such independent furrow openers have been found to perform better in soft, wet soil conditions than the frame mounted openers, as the ground following wheel prevents the furrow opener from sinking further into the soil if the frame wheels sink in the soft soil. Seeding depth is thus better controlled, and the downward bias force exerted on the arm can be reduced where the soil is very soft. The weight of the implement is also partially carried on the ground following wheels, thus somewhat reducing the weight on the front and rear frame wheels, and reducing the tendency for the front and rear fame wheels to sink into soft soil.

The rear wheels are typically fixed to the frame such that the rotational axes thereof are perpendicular to the operating travel direction. Typically as well, the front wheels are caster wheels that can pivot freely about a vertical caster axis. The fixed rear wheels keep the implement moving in a straight line following the tractor, while the castering front wheels allow the implement to turn since the rolling orientation of the caster wheels changes to follow the frame as it moves in a lateral direction during the turn.

A "floating" type hitch is pivotally attached to the frame about a hitch pivot axis oriented horizontally and perpendicular to the operating travel direction. The front end of the hitch connects to the tractor drawbar, and the floating hitch pivots up and down with the tractor drawbar and the frame as the tractor and implement move across a field and as terrain varies. This same arrangement is used on agricultural implements such as cultivators and the like, in addition to air seeders. The frame of a modern agricultural implement can be 80 feet or more wide, and so the frame is divided into side by side wing sections that pivot with respect to each other about frame pivot axes oriented parallel to the operating travel direction.

The front and rear frame wheels must support the weight of the implements, and in addition, ground engaging tools are often configured to draw them selves into the ground, thereby exerting additional downward forces that must be carried by the wheels. Compounding this problem is the fact that on floating hitch implements, the tractor drawbar is often lower than the hitch pivot axis, which results in an additional downward force component on the front of the frame, especially on the center section where the hitch is attached. Thus in soft soil conditions, the wheels, and the front wheels in particular, sink into the soil such that rolling resistance and draft forces increase significantly. Especially with frame mounted opener air seeders and cultivators without independent ground engaging tools, the depth of penetration of the ground engaging tools increases, which undesirably increases seed depth placement in an air seeder, and also further increases draft in all implements. When the soil is very soft as in wet weather, the implement can become stuck, and it is not then possible to carry on the seeding operation.

Significant problems with wet conditions at seeding time were encountered for example in large areas of western Canada during the spring of both 2010 and 2011, with many fields going unseeded because the window of suitable time closed before the fields were dry enough for the farmers to operate their seeding equipment.

Considerable advice was circulated with respect to working wet fields with air seeders, such as reducing down pressure on furrow openers, changing packer wheels, altering travel paths, and the like. It was generally accepted that air seeders with independent ground following openers worked better, but in many areas the soil was too wet for these air seeders. Many farmers seeded by simply broadcasting seed on the soil, often from airplanes.

Significant effort was devoted to providing increased flotation for air seeders in an attempt to keep them operative in very wet field conditions. Some offered larger front caster wheel tires in an attempt to provide increased flotation, however it is not possible to significantly increase the diameter of the tires. Some farmers fitted track assemblies in place of the front caster wheels. Seed Master™ of Regina, Canada recommended an optional lift kit for their air seeders to reduce the problem of getting stuck. The lift kit reduced the weight on the front caster wheels by transferring weight from the front caster wheels to the tractor drawbar and to the rear wheels through an arrangement described in Canadian Patent Application Number 2,645,522.

Increasing the diameter of a wheel generally provides a greater improvement in flotation and reduced rolling resistance compared to increasing the wheel width, and so it is desirable to provide larger diameter wheels. The diameter of the fixed rear wheels may be increased significantly to provide an increased support area of contact with the ground, however increasing the diameter of the castering front wheels that are pivotally attached to the frame through caster pivots is problematic for a number of reasons.

The hitch to tow the implement is attached to the center section, and the front wheels supporting the center section must be mounted on either side of the hitch. In order to use a large diameter castering flotation tire on the front of this center section the castering wheels would need to be moved away from the hitch such that there is sufficient distance on each side to provide a clear pivot envelope for the large diameter wheel to pivot between the caster axis and the hitch as it pivots through 360 degrees. In some implements it is known to support the front of the center section with a single caster wheel assembly in the middle of the center section, instead of mounting one on each side, however with larger implements with wing sections extending from each side of the center section, this arrangement lacks stability, especially when in transport.

If the size of the front caster wheel is increased significantly, such as to twice the diameter for example, the caster bracket will need to be significantly larger, stronger, and more costly. The distance between the caster axis and the wheel/ground contact surface increases proportionally, and the 360 degree envelope becomes problematic. Moving these center section front caster wheels wide enough apart to provide this clear envelope results in an excessive distance between the wheels, such that travel on roads during transport is difficult, if not impossible. The wider spacing also adversely affects ground contour following characteristics of the implement.

Such agricultural implements typically make a sharp turn at the end of a field pass, and the caster wheels twist against the ground as the caster axis moves sharply with the implement frame causing soil disturbance. The twisting of a larger tire against the ground surface will exert increased forces on the caster bracket, and also create a larger soil disturbance. Such soil disturbance is particularly undesirable in modern no-till farming practices because conventional tillage is not carried out on the field surface, and so any ruts and disturbance made by an implement are not smoothed out by normal cultivation.

Thus increasing the diameter of the front wheels of agricultural implements would be highly beneficial by providing increased flotation, however the diameter is constrained by the need to allow the front caster wheels to pivot to vary the rolling orientation thereof and allow the front end of the implement to move laterally during turns.

BRIEF SUMMARY

It is an object of embodiments of the present disclosure to provide an agricultural implement apparatus with increased flotation that overcomes problems in the prior art.

The increased flotation allows an air seeder as disclosed herein to operate in soft soil conditions where prior art air seeders would sink into the soil and become stuck. The number of days in a farmer's acceptable window of time for seeding where the seeder can be operated in wet soil conditions is increased, thus providing significant financial benefits in wet years when seeding of the crop in the limited window is not otherwise possible.

To allow the diameter of the front wheels to be increased, the orientation of the front wheels that were formerly allowed to caster is controlled so that the size of the clear envelope required for movement of the front wheels is reduced. The pivoting range of the front wheels could be limited to something less than 360 degrees by providing stops to restrict the rolling orientation of the castering wheels to a lesser angle, such as that required to turn a corner, however it would not then be possible to move the implement in reverse.

In a caster type wheel, the vertical caster axis is ahead of the rotational axis of the wheel in the direction of travel, and ahead of the contact surface between the wheel and the ground that is directly under the rotational axis such that the caster axis and contact surface are substantially aligned in the direction of movement with the wheel trailing behind the caster axis. The wheel pivots freely about the caster axis and will pivot about the caster axis to assume this relationship.

During a turn, the caster bracket attached to the implement frame that defines the vertical caster axis moves laterally and the caster wheel assembly pivots about the vertical caster axis to maintain the alignment in the new travel direction, and the rolling orientation of the wheel changes to follow the implement frame. When the implement moves in reverse, as the caster bracket starts to move rearward, the wheel may initially roll rearward ahead of the caster axis, but as soon as the ground contact surface and caster axis are no longer exactly aligned in the travel direction, the caster wheel will pivot about 180 degrees in one direction or the other so the wheel is trailing behind the caster axis. Because the wheel must pivot in either direction, an open pivot envelope must be provided that allows the caster wheel to pivot through 360 degrees.

In embodiments, the size of the clear envelope is reduced by controlling the rolling orientation of the front wheels instead of allowing the wheels to pivot freely through 360 degrees as in the prior art. Thus the size of the clear pivot envelope that must be provided to allow the front wheels to pivot through the required operational range is much reduced, and the large flotation front wheels can be located close to the hitch.

In one embodiment, an agricultural implement apparatus comprising a frame supported on rear wheels and at least one front flotation wheel for movement along the ground in an operating travel direction, and a plurality of ground engaging tools mounted on the frame substantially equally on each side of a frame axis extending parallel to the operating travel direction is provided. The at least one front flotation wheel is pivotally mounted to the frame about a substantially vertical wheel pivot axis. A hitch tongue has a rear end pivotally attached to a lateral mid-point of the frame about a substantially vertical hitch pivot axis located substantially on the frame axis, and a front end adapted for pivotal attachment to a drawbar of a towing vehicle by a substantially vertical drawbar pin. A wheel control mechanism connects the at least one front flotation wheel to the hitch tongue such that pivotal movement of the at least one front flotation wheel about the wheel pivot axis follows pivotal movement of the hitch tongue about the hitch pivot axis. The wheel control mechanism is configured such that when the hitch tongue is in a neutral position aligned with the frame axis, the at least one front flotation wheel is oriented to roll in the operating travel direction, and pivoting the hitch tongue about the hitch pivot axis away from the neutral position causes the at least one front flotation wheel to pivot about the wheel pivot axis.

In a second embodiment, a method of controlling the rolling orientation of at least one front flotation wheel of an agricultural implement is provided. The method comprises supporting a frame on rear wheels and the at least one front flotation wheel for movement along the ground in an operating travel direction, and mounting a plurality of ground engaging tools on the frame substantially equally on each side of a frame axis extending parallel to the operating travel direction; pivotally mounting the at least one front flotation wheel to the frame about a substantially vertical wheel pivot axis; pivotally attaching a hitch tongue at a rear end thereof to a lateral mid-point of a width of the frame about a substantially vertical hitch pivot axis located substantially on the frame axis, and pivotally attaching a front end of the hitch tongue to a tow vehicle drawbar with a substantially vertical drawbar pin; connecting the at least one front wheel to the hitch tongue with a wheel control mechanism configured such that when the hitch tongue is in a neutral position the at least one front wheel is oriented to roll in the operating travel direction, and such that pivotal movement of the at least one front wheel about the wheel pivot axis follows pivotal movement of the hitch tongue about the hitch pivot axis; and operating the tow vehicle to tow the frame along a field surface with the ground engaging tools penetrating the field surface.

The devices and methods disclosed herein thus addresses the problem of mounting large diameter flotation wheels on the front of the implement by providing a control mechanism for the rolling orientation of at least the center front wheels located on either side of the hitch. These large diameter wheels can thus be mounted about as close to the hitch as the prior art castering front wheels, such that road travel and contour following characteristics are not adversely affected. In addition to allowing for larger tires, the control apparatus improves performance on turns in the field, reducing soil disturbance as compared to freely castering wheels when in the field, and improves maneuverability when in transport. In another embodiment, a pivot restraint mechanism can also be operative to selectively secure the hitch tongue in the neutral position to reduce skewing tendencies when in field operation.

Additionally, the large diameter of the tire allows the tire to roll over soil that is often loosened and piled up by the spinning action of tractor tires. The situation that is created by the spinning action of the tractor tires can cause smaller diameter tires to stop turning, begin skidding and begin piling up soil ahead of the tire, which greatly increases the force required to tow the drill. This in turn increases the spinning action of the tractor tires as they attempt to apply more force to overcome the increasing resistance, and eventually the seeding implement can become stuck. The spinning action of the tractor tires also typically causes the tires on the air seeder that follow the tractor tires to drop relative to the nominal soil surface. When the depth of the seeding opener is partially controlled by the front wheel on the drill frame, the seeding depth is also adversely affected and the draft required to tow the seeding implement is increased thereby increasing the spinning action of the tires which further drops the depth of the seeding openers until the seeding unit become stuck. At times, the combination of the caster wheels skidding and piling up wet soil and the seeding openers dropping causes the seeding implement and tractor to become stuck.

BRIEF DESCRIPTION OF THE DRAWING

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION

Figure 1:
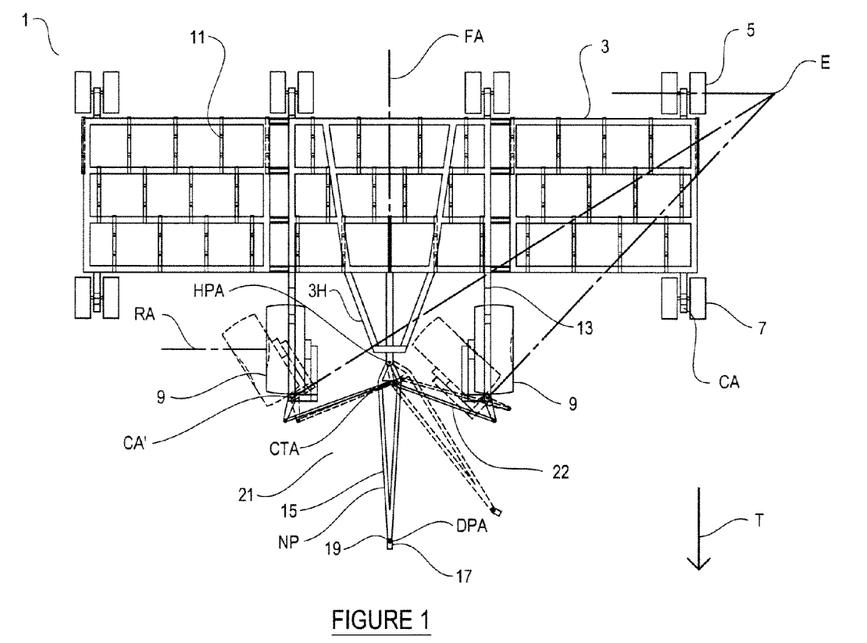
FIG. 1 is a schematic top view of an embodiment of an agricultural implement apparatus where the front flotation wheels are castering wheels and the wheel control mechanism is provided by control arms.

FIG. 1 schematically illustrates an embodiment of an agricultural implement apparatus 1. The apparatus 1 comprises a frame 3 supported for movement along the ground in an operating travel direction T on rear wheels 5, right and left outboard castering front wheels 7, and right and left controlled flotation front wheels 9. A plurality of ground engaging tools 11, for example the furrow openers of an air seeder or cultivator shanks, are mounted on the frame 3 substantially equally on each side of a frame axis FA extending parallel to the operating travel direction. The rear wheels 5 are fixed to the frame such that rotational axes thereof are perpendicular to the operating travel direction T. The right and left outboard castering front wheels 7 pivot freely about substantially vertical caster axes CA.

Front flotation wheels 9 are illustrated as the conventional castering type wheels pivotally mounted to the frame 3 on wheel arms 13 about substantially vertical wheel pivot axes provided by caster axes CA' located forward of the rotational axes RA of the flotation wheels 9, however the front flotation wheels 9 have a diameter that is about twice the diameter of the rear wheels 5 and outboard castering front wheels 7 and are much wider as well. The smaller wheels 5 and 7 are shown as dual wheel assemblies, with two side by side wheels instead of the single large diameter front flotation wheel 9, however the larger single wheel does provide increased floatation compared to the smaller diameter dual wheels.

A hitch tongue 15 has a rear end pivotally attached to a lateral mid-point of the frame, located substantially on the frame axis FA, about a substantially vertical hitch pivot axis HPA, and has a front end adapted for pivotal attachment to the drawbar 17 of a tractor or like towing vehicle by a substantially vertical drawbar pin 19 which provides a substantially vertical drawbar pivot axis DPA.

A wheel control mechanism 21 connects the front flotation wheels 9 to the hitch tongue 15 such that pivotal movement of the front flotation wheels 9 about the caster axes CA' follows pivotal movement of the hitch tongue 15 about the hitch pivot axis HPA. The wheel control mechanism 21 is configured such that when the hitch tongue 15 is in a neutral position NP aligned with the frame axis FA, the front flotation wheels 9 are oriented to roll in the operating travel direction T, and pivoting the hitch tongue 15 about the hitch pivot axis HPA away from the neutral position NP causes the front flotation wheels 9 to pivot about the caster axes CA', as schematically illustrated in FIG. 1 where moving the hitch 15 to the left, as in making a left turn, turns the rolling orientation of the front flotation wheels 9 to the left to follow the left turn.

Figure 2:
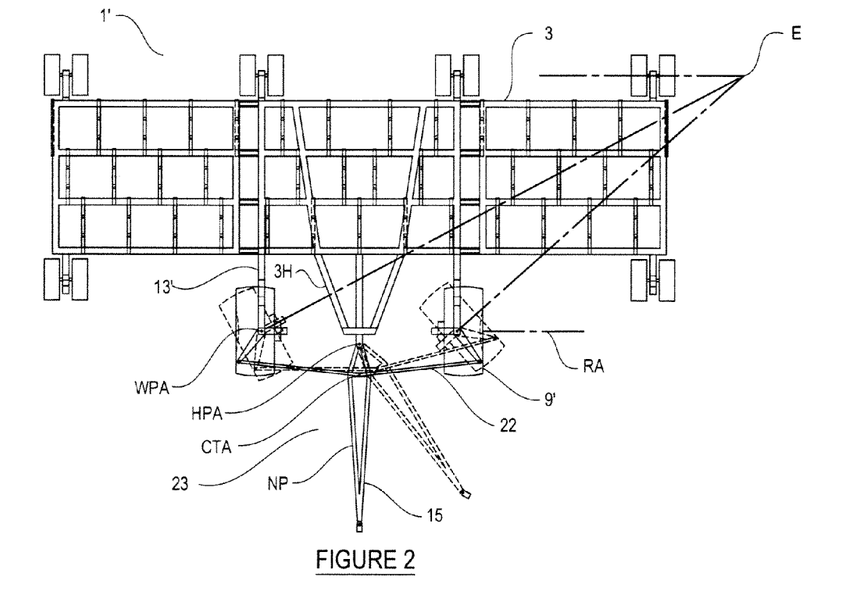
FIG. 2 is a schematic top view of an alternate embodiment of an agricultural implement apparatus as disclosed herein where the front flotation wheels are mounted about a vertical wheel pivot axis located directly above the rotational axes of the front flotation wheels, and where the wheel control mechanism is provided by control arms.

In the embodiment of FIG. 1, the wheel control mechanism 21 is provided by right and left control arms 22 connect corresponding right and left flotation front wheels 9 to the hitch tongue 15 at a control axis CTA forward of the hitch pivot axis HPA. The right and left control arms 22 are configured such that pivoting the hitch tongue 15 about the hitch pivot axis HPA away from the neutral position NP causes the right and left flotation front wheels 9 to pivot about the corresponding caster axes CA' such that front edges of the right and left flotation front wheels 9 move in the same direction as the hitch tongue 15, substantially as illustrated in FIG. 2. When the hitch tongue 15 is in the neutral position NP the right and left front flotation wheels 9 are oriented to roll in the operating travel direction T.

Thus the rolling orientation of the front flotation wheels 9 is controlled by the position of the hitch tongue 15. When the hitch tongue 15 moves laterally during a turn, the front flotation wheels 9 turn in the same direction.

It can be seen in FIG. 1 that when the castering front flotation wheels 9 pivot about the caster axes CA', the clear envelope required for movement of the front flotation wheels 9 about the caster axes CA' must be large enough to accommodate the distance from the caster axis CA' to the rear edge of the wheel 9. The wheel 9 is offset rearward from the caster axis CA' and so the entire width of the wheel 9 must move toward the forward extending hitch section 3H of the frame 3.

FIG. 2 therefore schematically shows a more advantageous embodiment of an agricultural implement apparatus 1' where the front flotation wheels 9' are pivotally mounted to the frame 3 about substantially vertical wheel pivot axes WPA located directly above the rotational axes RA of the flotation wheels 9'. Since pivotal movement of the front flotation wheels 9' is controlled, the castering configuration is not required. The wheel control mechanism 21 is again provided by right and left control arms 22 substantially the same as in FIG. 1 that connect corresponding right and left flotation front wheels 9' to the hitch tongue 15 at the control axis CTA forward of the hitch pivot axis HPA.

Thus in the apparatus 1' of FIG. 2, when the front flotation wheels 9' pivot about the wheel pivot axes WPA, the clear envelope required for pivotal movement of the front flotation wheels 9 is reduced compared to the castering front flotation wheels 9 of FIG. 1. The wheel 9' is not offset rearward from the wheel pivot axis as in FIG. 1, and so only one half the width of the wheel 9' moves toward the forward extending hitch section 3H of the frame 3, and the wheel arms 13' can be located closer to the forward extending hitch section 3H of the frame 3. It is contemplated that it may be desirable to shorten the wheel arms 13' further and move the wheel pivot axis WPA behind the rotational axis RA of the front flotation wheels 9'.

Figure 3:
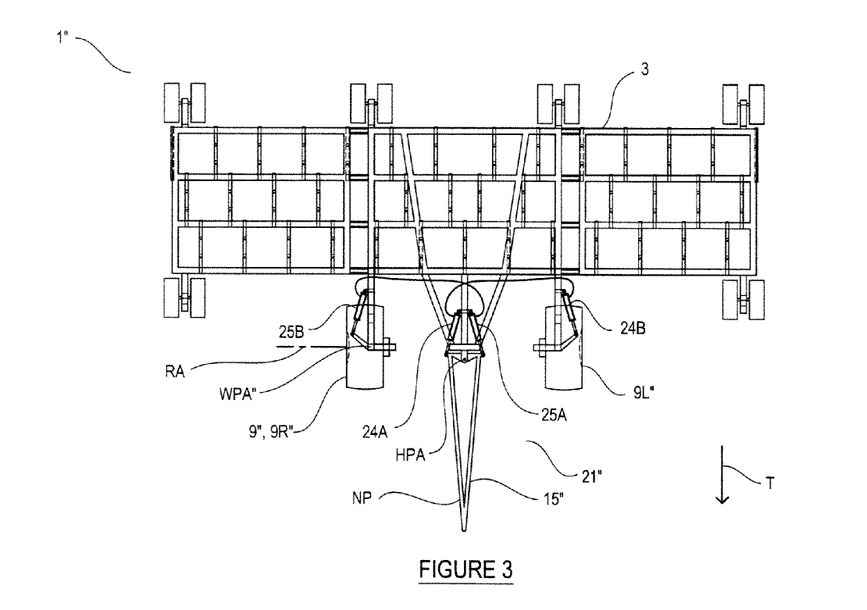
FIG. 3 is a schematic top view of an alternate embodiment of an agricultural implement apparatus where the front flotation wheels are mounted about a vertical wheel pivot axis located directly above the rotational axes of the front flotation wheels, and where the wheel control mechanism is provided by connected hydraulic cylinders.
Figure 4:
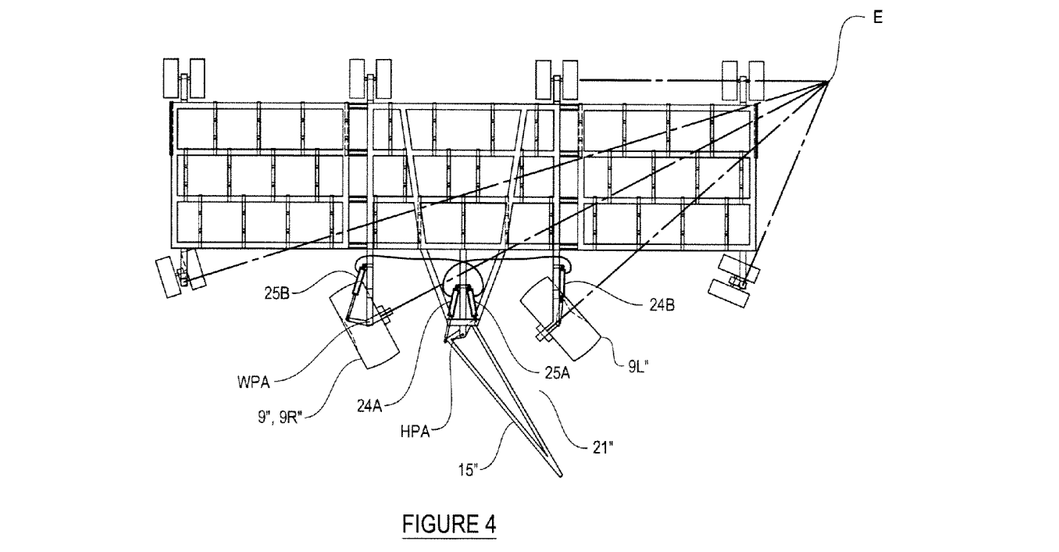
FIG. 4 is a schematic top view of the embodiment of FIG. 3 with the hitch tongue in a leftward turning position, and the front flotation wheels turned to the left.

FIGS. 3 and 4 schematically illustrate a further alternate agricultural implement apparatus 1" where the front flotation wheels 9" are mounted on wheel pivot axes WPA" above the rotational axes RA" of the wheels 9", the same as in the apparatus 1' shown in FIG. 2, but in the illustrated apparatus 1", the wheel control mechanism 21" is provided by hydraulic cylinders. A left pair of control hydraulic cylinders 24 comprises a first hydraulic cylinder 24A connected to the hitch tongue 15" and to the frame 3, and a second hydraulic cylinder 24B connected to the frame 3 and to the left front flotation wheel 9L". Chambers of the first and second hydraulic cylinders 24A, 24B are connected or slaved such that movement of the hitch tongue 15" away from the neutral position NP shown in FIG. 3 moves hydraulic fluid from the first hydraulic cylinder 24A into the second hydraulic cylinder 24B to pivot the left front flotation wheel 91" about the wheel pivot axis WPA" in the direction moved by the hitch tongue 15".

In the apparatus 1" illustrated in FIG. 3 the hitch tongue 15" extends rearward of the hitch pivot axis HPA and the first hydraulic cylinder 24A of the left pair of control hydraulic cylinders 24 is connected to the hitch tongue 15" rearward of the hitch pivot axis HPA and on the side of the hitch tongue 15" opposite the left front flotation wheels 9L". Thus when the hitch tongue 15" moves to the left, the first hydraulic cylinder 24A extends and hydraulic fluid is pushed into the second hydraulic cylinder 24B which retracts and turns the left front flotation wheel 9L" to the left, as illustrated in FIG. 4

In the same manner a right pair of control hydraulic cylinders 25 comprises a first hydraulic cylinder 25A connected to the hitch tongue 15" rearward of the hitch pivot axis HPA and to the frame 3, and a second hydraulic cylinder 25B connected to the frame 3 and to the right front flotation wheel 9R". Chambers of the first and second hydraulic cylinders 25A, 25B are connected such that movement of the hitch tongue 15" away from the neutral position NP moves hydraulic fluid from the first hydraulic cylinder 25A into the second hydraulic cylinder 25B to pivot the right front flotation wheel 9R" in the direction moved by the hitch tongue 15.

FIGS. 5-9 schematically illustrate an alternate embodiment of an agricultural implement apparatus 101. The apparatus 101 comprises a frame 103 supported for movement along the ground in an operating travel direction T on rear wheels 105, right and left outboard castering front wheels 107, and right and left controlled flotation front wheels 109. A plurality of ground engaging tools 111, for example the furrow openers of an air seeder or cultivator shanks, are mounted on the frame 103 substantially equally on each side of a frame axis FA extending parallel to the operating travel direction. The rear wheels 105 are fixed to the frame such that rotational axes thereof are perpendicular to the operating travel direction T. The right and left outboard castering front wheels 107 pivot freely about substantially vertical caster axes CA.

Figure 5:
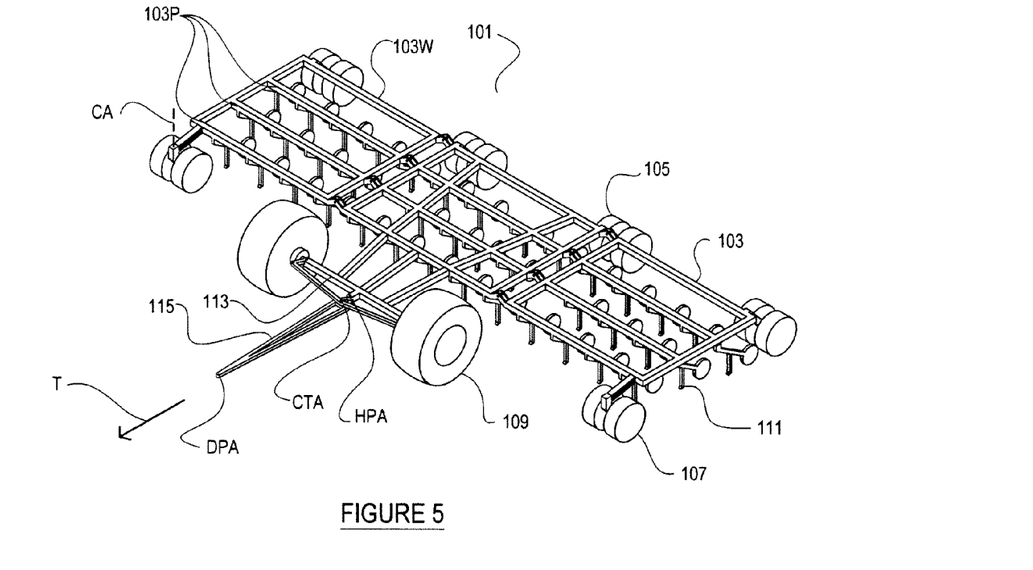
FIG. 5 is a schematic perspective view of an embodiment of an agricultural implement apparatus.

The frame 103 comprises a forward extending hitch section 103H and an axle member 113 is mounted at a front end of the hitch section 103H substantially perpendicular to the operating travel direction T and in a center of a width of the frame 103. It is contemplated that in large implements, the axle member 113 will be fixed with respect to the frame, and essentially form part of the frame. The right and left flotation front wheels 109 are pivotally mounted to the frame 103 by mounting same on corresponding right and left ends of the axle member 113 about substantially vertical right and left wheel pivot axes WPA. The axle member 113 is substantially aligned with rotational axes of the right and left flotation front wheels 109 when the flotation front wheels 109 are rolling in the operating travel direction T.

It can be seen that the flotation front wheels 109 have a much larger diameter as well as width than the outboard castering front wheels 107 and thus provide significantly improved flotation for the center front portion of the frame 103. It is contemplated that the front flotation wheels will have a diameter of greater than about four feet, substantially larger than conventional castering front wheels which are typically up to about 40 inches in diameter, and in this description the term "flotation wheel" generally refers to a wheel much larger than conventional implement wheels, and in particular to wheels with a diameter greater than about four feet.

A hitch tongue 115 has a rear end pivotally attached to a lateral mid-point of the frame about a substantially vertical hitch pivot axis HPA, and has a front end adapted for pivotal attachment to the drawbar 117 of a tractor or like towing vehicle by a substantially vertical drawbar pin 119 which provides a substantially vertical drawbar pivot axis DPA.

Figure 6:
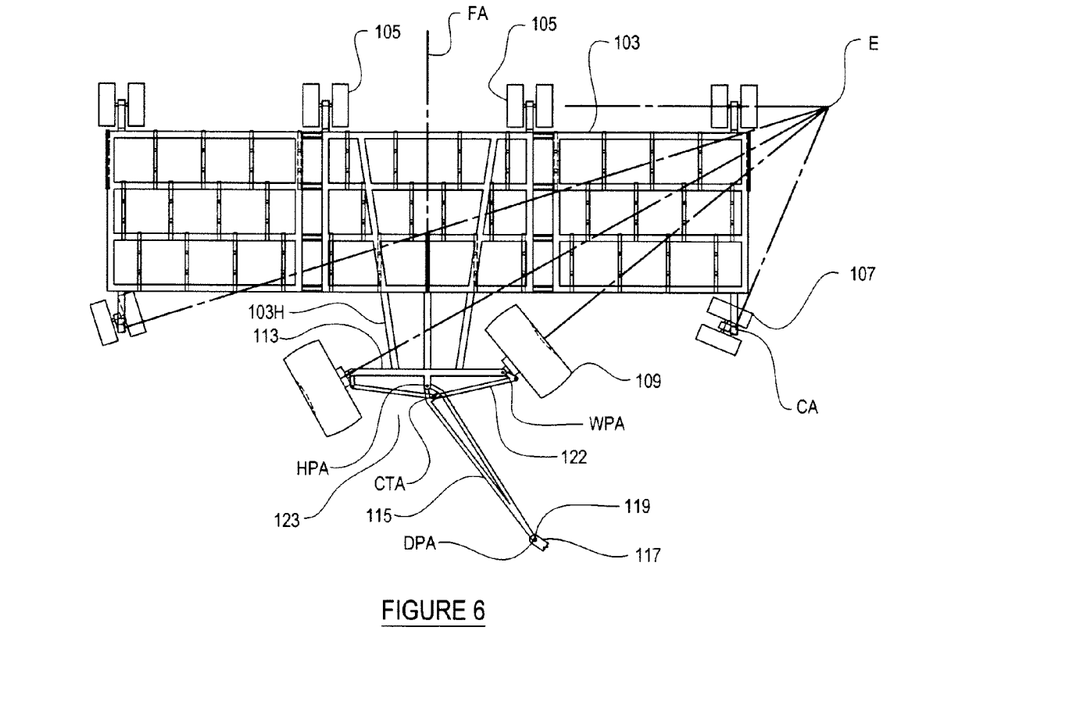
FIG. 6 is a top view of the embodiment of FIG. 5 with the hitch tongue in a leftward turning position.

The wheel control mechanism 123 is provided by right and left control arms 122 connecting corresponding right and left flotation front wheels 109 to the hitch tongue 115 at a control axis CTA forward of the hitch pivot axis HPA. The right and left control arms 22 are configured such that pivoting the hitch tongue 115 about the hitch pivot axis HPA away from the neutral position NP shown in FIG. 7, aligned with the frame axis FA, causes the right and left flotation front wheels 109 to pivot about the corresponding right and left wheel pivot axes WPA such that front edges of the right and left flotation front wheels 109 move in the same direction as the hitch tongue 115, substantially as illustrated in FIG. 6. When the hitch tongue 115 is in the neutral position NP the right and left front flotation wheels 109 are oriented to roll in the operating travel direction T.

Thus the rolling orientation of the front flotation wheels 109 is controlled by the position of the hitch tongue 115. When the hitch tongue 115 moves laterally during a turn, the front flotation wheels 109 follow and turn in the same direction.

Figure 7:
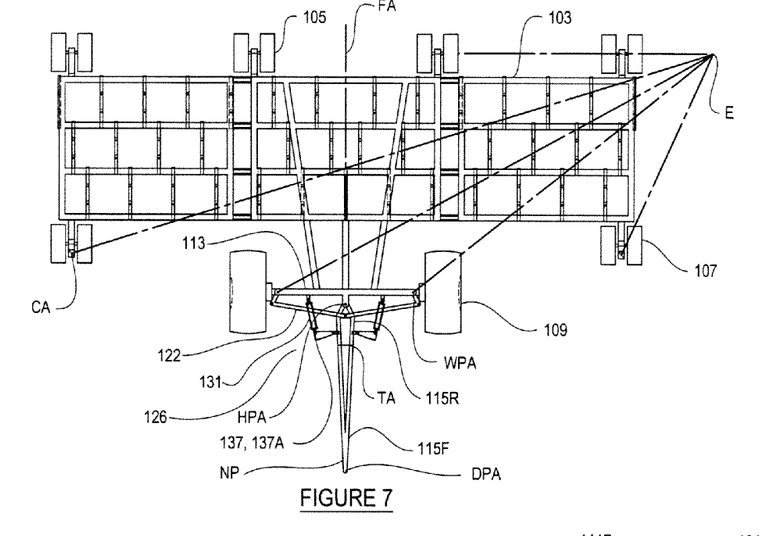
FIG. 7 is a top view of the embodiment of FIG. 5 with the hitch tongue in the neutral position and with a pivot restraint mechanism installed and in the release position.

To allow the hitch tongue 115 to float to follow the ground, the hitch tongue 115 will typically comprise a rear tongue section 115R pivotally attached to the frame about the substantially vertical hitch pivot axis HPA and a front tongue section 115F pivotally attached to the rear tongue 115R section about a substantially horizontal tongue section axis TA, as illustrated in FIG. 7. For clarity of illustration of the principles of operation of the disclosed embodiments these features are not shown on the other drawings.

Figure 8:
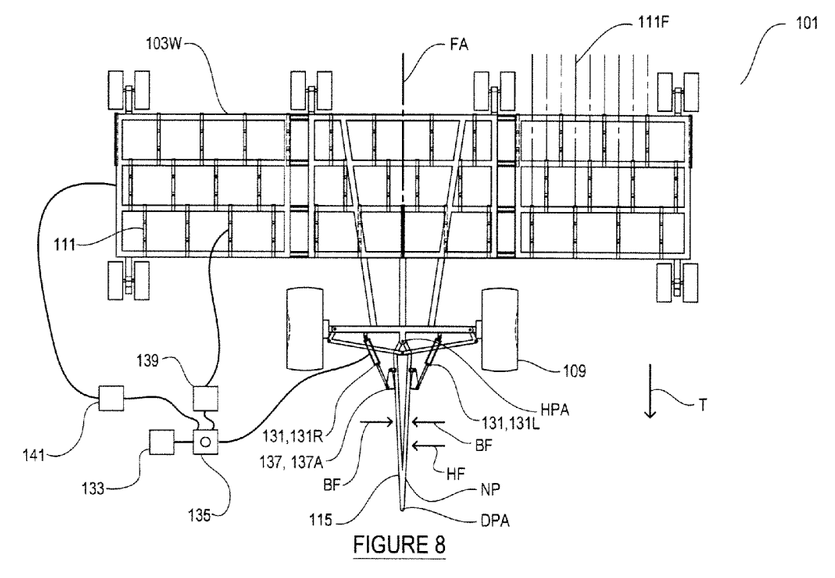
FIG. 8 is a top view of the embodiment of FIG. 7 with the hitch tongue in the neutral position and with the pivot restraint mechanism in the restraint position.

The frame 103 and hitch tongue 115 are configured such that when the hitch tongue 115 is in a neutral position NP with respect to the hitch pivot axis, as illustrated in FIGS. 7 and 8, the hitch tongue 115 is in a desired operating orientation with respect to the frame 103, aligned with the frame axis as shown in FIG. 7.

Especially in minimum tillage agricultural operations that are popular today, there is considerable plant residue left on field soil surfaces where agricultural implements are used. Soil and plant residue are disturbed by the ground engaging tools, and must flow around the tool as it moves through the soil. To provide room for soil and residue to flow around the ground engaging tools, the tools are mounted to the frame in a number of generally parallel rows that are spaced apart from the front of the frame to the rear of the frame. The frame 103 of the illustrated apparatus 101 therefore comprises parallel members 103P spaced from the front to the rear of the frame, and the ground engaging tools 111 are spaced along the parallel members 103P, with equal numbers on each side of the frame axis FA. Thus the ground engaging tools 111 on each row are separated by a distance equal to three times the row spacing, providing ample room for soil and plant residue to flow between the tools 111 on each row.

When the frame 103, and thus parallel members 103P, are oriented perpendicular to the operating travel direction T, the ground engaging tools 111 engage the ground at substantially equally spaced furrows 111F. This then is the desired orientation of the frame 103, and when the hitch tongue 115 is in the neutral position, it extends forward from the hitch pivot axis HPA in the center of the width of the frame 103 at the frame axis FA, parallel to the operating travel direction T and aligned with the frame axis FA, and perpendicular to the parallel members 103P of the frame.

During operation, due to soil conditions, slopes, and the like, one side of the frame 103 is often subjected to drag forces that are greater or less than those on the other side so that one side drags back and the frame 103 pivots about the drawbar pin axis DPA and moves along the field at some angle that is not perpendicular to the operating travel direction T. This is commonly called a skewed orientation and is undesirable since as the frame 103 skews, the furrows in the soil move from an equal spacing to an unequal spacing.

Where considerable weight is carried on the implement frame, such as in some air seeders where agricultural products are carried on the frame, skewing is not such a significant problem, as the weight on the wheels increases the drag force required to cause the frame to skew. In other common air seeders where the agricultural products are carried on a separate cart, skewing can be more problematic. In such air seeders, to reduce skewing a pivot restraint mechanism 126 can be provided that is selectively operative to secure the hitch tongue 115 in the neutral position NP as illustrated in FIGS. 7-8.

Figure 15:
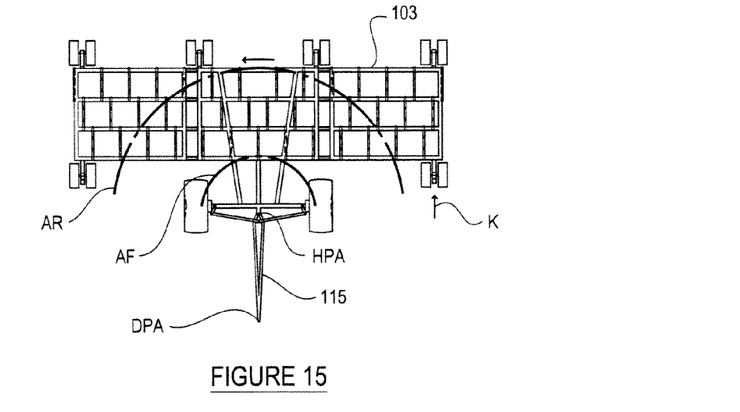
FIG. 15 schematically illustrates skewing of the implement frame about the hitch pivot axis.
Figure 16:
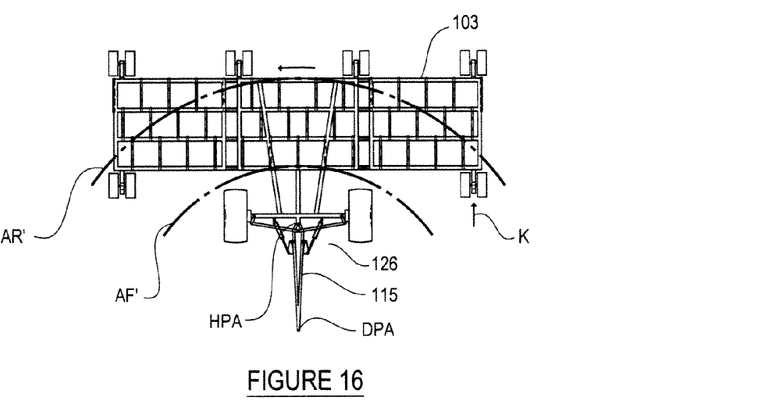
FIG. 16 schematically illustrates skewing of the implement frame about the drawbar pivot axis.

The desired equally spaced furrows 111F are provided when the frame 103 is perpendicular to the operating travel direction T. Unequal forces on the right and left sides of the frame 103 result in a net force K, as shown in FIGS. 15 and 16, which will cause the frame 103 to skew, where one side of the frame moves backward and the other side moves forward. In a conventional hitch assembly, the hitch tongue is fixed perpendicular to the frame and the frame thus pivots about the drawbar pivot axis at the front of the hitch tongue.

However in order to provide control of the rolling orientation of the front wheels, the hitch tongue 115 of the present apparatus 101 must be able pivot at the hitch pivot axis HPA much closer to the frame. In that case when the frame 103 skews or pivots in response to unequal forces, the front end of the frame 103 will move through an arc AF with a center at the hitch pivot axis HPA, and the rear end of the frame 103 will move through an arc AR with a center at the hitch pivot axis HPA, as schematically illustrated in FIG. 15. It can be seen that, for any given degree of skew, ground engaging tools along the rear of the frame 103 will move laterally much farther than those on the front end of the frame 103, and the furrow spacing will be impaired with only a relatively small degree of skewing. It is generally accepted that maximum crop yields are attained when plants are evenly spread across the field, so the unequal spacing of furrow openers on air seeders caused by implement skewing is undesirable.

With the pivot restraint mechanism 126 securing the hitch tongue 115 in the neutral position, the frame 103 will pivot about the vertical drawbar pivot axis DPA at the front of the hitch tongue 115, as schematically illustrated in FIG. 16. Then when the frame 103 skews in response to unequal forces, the front end of the frame 103 will move through an arc AF' with a center at the drawbar pivot axis DPA, and the rear end of the frame 103 will move through an arc AR' with a center at the drawbar pivot axis DPA. Relative lateral movement of the ground engaging tools on the front and rear ends of the frame 103 is much reduced, and impairment of the furrow spacing is reduced. Thus the pivot restraint mechanism 126 can be operated to engage the hitch tongue 115 and when the implement apparatus 101 is moving generally straight in the operating travel direction T, and then to disengage the hitch tongue 115 and allow same to pivot about the hitch pivot axis HPA when it is desired to turn the front flotation wheels 109, such as during a sharper turn.

Figure 17:
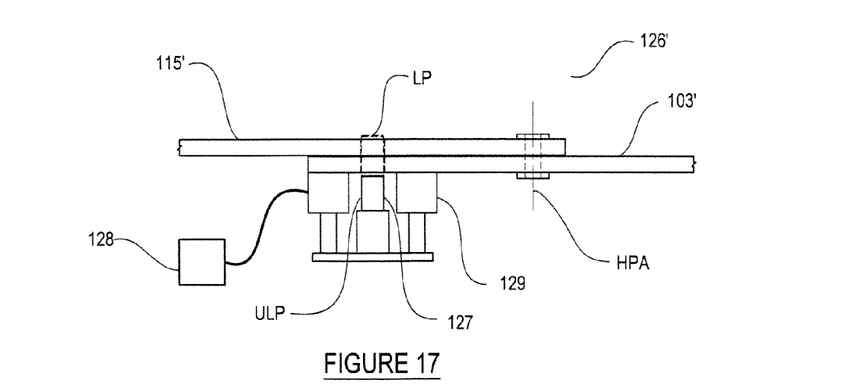
FIG. 17 schematically illustrates a basic embodiment of a pivot restraint mechanism that is provided by a lock pin movable from a locked position, engaging the hitch tongue and the frame in the neutral position, to an unlocked position releasing the hitch tongue to pivot freely.

In a very basic embodiment, such as is schematically illustrated in FIG. 17, a pivot restraint mechanism 126' could be provided by a lock pin 127 movable from a locked position LP, illustrated in phantom lines, engaging the hitch tongue 115' and the frame 103' through holes in each and thus securing the hitch tongue 115' in the neutral position, to an unlocked position ULP where the lock pin 127 is disengaged from the holes in the hitch tongue 115' and the frame 103', and a control 128 selectively operative to activate pin actuators 129 to move the pin 127 to one of the locked position LP and the unlocked position ULP.

Figure 9:
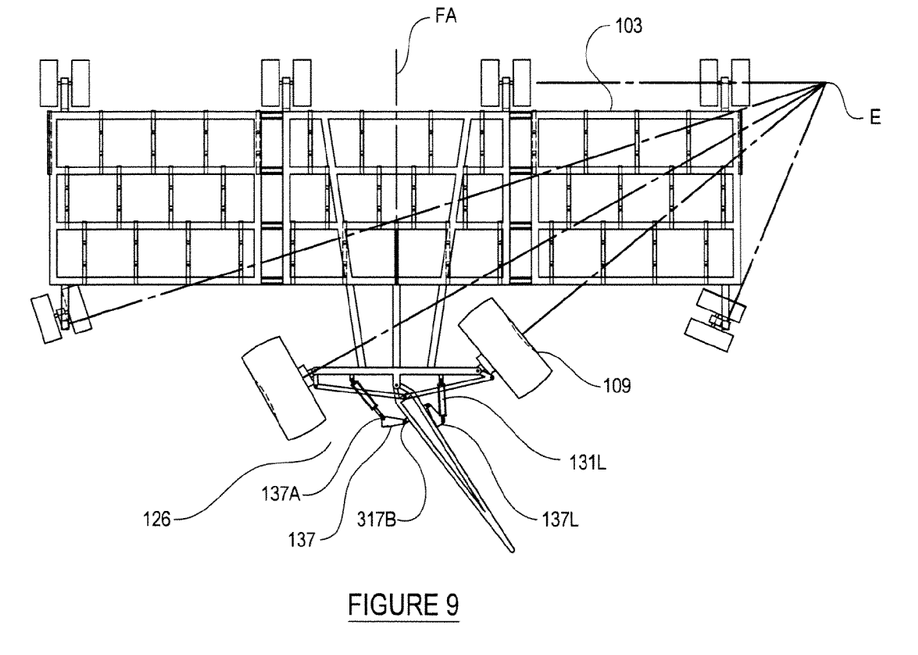
FIG. 9 is a top view of the embodiment of FIG. 7 with the hitch tongue in a leftward turning position and with the pivot restraint mechanism in the release position.

More conveniently, the pivot restraint mechanism 126 illustrated in FIGS. 7-9 comprises right and left extendable actuators 131 connected between the frame 103 and hitch tongue 115.

The right extendable actuator 131R is movable from a restraint position illustrated in FIG. 8, resisting rightward pivotal movement of the hitch tongue 115 away from the neutral position NP, to a release position illustrated in FIG. 7 where the hitch tongue 115 is free to move rightward away from the neutral position NP. Similarly the left extendable actuator 131L is movable from a restraint position illustrated in FIG. 8, resisting leftward pivotal movement of the hitch tongue 15 away from the neutral position NP, to a release position illustrated in FIG. 7 where the hitch tongue 115 is free to move leftward away from the neutral position 15.

The extendable actuators 131 are provided in the illustrated apparatus 101 by right and left hydraulic cylinders 131R, 131L. The right and left hydraulic cylinders 131R, 131L are configured to be fully extended when in the restraint position of FIG. 8 with the hitch tongue 115 in the neutral position, and are operated as bias elements operative to exert a bias force BF resisting movement of the hitch tongue 115 away from the neutral position NP. An active hydraulic source 133 is connected to the right and left hydraulic cylinders 131R, 131L through a hydraulic control 135 as schematically illustrated in FIG. 8 only. The hydraulic control 135 is operative to move the hydraulic cylinders between the restraint position of FIG. 8 and the release position of FIG. 7. Being fully extended in the restraint position, the hydraulic cylinders 131 in that position do not exert any force against the hitch tongue, but movement away from the neutral position tends to cause one of the hydraulic cylinders to retract and the bias force BF is then exerted to resist retraction. It is also contemplated that hydraulic cylinders could instead be configured to be fully retracted when in the restraint position and exert the bias force when a force is exerted to extend the hydraulic cylinders.

When the hydraulic cylinders 131 are in the restraint position, pressurized hydraulic fluid at an active pressure from the active hydraulic source 133 is directed into the hydraulic cylinders 131 to exert the bias force BF, and the active hydraulic source 133 is operative to allow pressurized hydraulic fluid to pass out of the hydraulic cylinders 131 when a hitch force HF exerted on the hitch tongue 115 in a direction away from the neutral position NP exceeds the bias force BF, such that the hitch tongue 115 moves away from the neutral position NP against the bias force BF.

By this arrangement, movement of the hitch tongue 115 and thus pivoting of the front flotation wheels 109 is possible when the towing vehicle makes a turn that exerts a sufficiently large hitch force HF to overcome the bias force BF. It is contemplated that the uneven forces that cause skewing will pivot the hitch tongue 115 about the drawbar pivot axis DPA and will not generally be sufficiently large to overcome the bias force BF and move the hitch tongue 115 from the neutral position NP. Thus the desired operation with the hitch tongue 115 in the neutral position NP will be maintained until the greater hitch forces HF generated during a turn are encountered.

Ideally to maintain equal furrow spacing it is desirable to drive across a field in straight lines, making a 180 degree turn at each end. Field shapes however are not always amenable to travelling in a straight line and some curves and turns of greater or lesser degree are a common part of farm implement operations. The pressure control 135 is also operative to adjust the active pressure to adjust the bias force BF to allow movement of the hitch tongue 115, and thus turning of the front flotation wheels 109, at a selected hitch force. Thus the bias force BF can be adjusted so that in a gentle turn, the hitch tongue is maintained in the neutral position NP, while in a sharper turn the hitch tongue 115 can move away from the neutral position NP and turn the implement apparatus 101.

In the pivot restraint mechanism 126 of the illustrated apparatus 101, each of the right and left hydraulic cylinders 131 is pivotally connected at a rear end thereof to the forward extending hitch section 103H of the frame 103 and at a front end thereof to a first end 137A of a link member 137. The opposite second end 37B of the link member 137 is pivotally connected to the hitch tongue 115. Moving the hydraulic cylinders 131 to the restraint position by directing pressurized hydraulic fluid into the hydraulic cylinders 131 such that the hydraulic cylinders 131 extend moves the first ends 137A of the link members 137 against the hitch tongue 115, as shown in FIG. 8, and shifts the hitch tongue 115 to the neutral position NP. When the hydraulic cylinders 131 are fully extended, the first ends 137A of the link members 137 are positioned closely adjacent each side of the hitch tongue 115, and secure the hitch tongue 115 in the neutral position.

Moving the hydraulic cylinders to the release position moves the first ends 137A of the link members 137 away from the hitch tongue 115 as shown in FIG. 7. The hydraulic cylinders 131 are fully extended when in the restraint position and also fully retracted when in the release position of FIG. 7. The hydraulic cylinders 131 and link members 137 are configured such that when the hydraulic cylinders 131 are in the release position and the hitch tongue pivots leftward to a selected maximum degree from the neutral position NP, as illustrated in FIG. 9, the first end 137A of the left link member 137L connected to the left hydraulic cylinder 131L bears against the hitch tongue 115 and prevents pivotal movement of the hitch tongue 115 beyond the selected maximum degree shown in FIG. 9. Rightward movement of the hitch tongue 115 is similarly limited.

The hydraulic control 135 acts as a pivot control selectively operative to move the pivot restraint mechanism 126 from a restraint mode, where the hitch tongue 115 is secured in the neutral position, to a release mode where the hitch tongue 115 is free to pivot about the hitch pivot axis HPA. A tool control 139 is selectively operative to raise and lower the ground engaging tools 111 with respect to the frame 103. Conveniently the hydraulic pivot control 135 is operatively connected to the tool control 139 such that when the ground engaging tools 111 are raised, the hydraulic pivot control 135 moves the pivot restraint mechanism 126 to the release mode, and when the ground engaging tools 111 are lowered, the hydraulic pivot control 135 moves the pivot restraint mechanism 126 to the restraint mode. When making straight passes back and forth across a field, the ground engaging tools 111 are typically raised at the end of each pass to facilitate making the 180 degree turn. With this arrangement, when the ground engaging tools are raised, the pivot restraint mechanism 126 automatically releases the hitch tongue to pivot and provide pivotal movement of the front flotation wheels 109.

The implement apparatus 1 will typically include a transport control 141 selectively operative to move the frame 103 to a transport position by raising the wings 103W to an upright position. It is contemplated that in most applications, when travelling in the transport position the pivot restraint mechanism 126 will be in the release mode so that the towing tractor can maintain steering control of a heavy implement. This is also desirable when making a sharp turn, such as from the road into a field approach.

FIGS. 10-14 schematically illustrate a version of the implement apparatus 101' where the outboard castering front wheels 107 of FIGS. 1-5 are replaced by right and left controlled outboard front wheels 143 of the same larger size as the central front flotation wheels 109 which provide significantly improved flotation for the outer front portions of the frame 103. The pivot restraint mechanism 126 as described above is added to the implement apparatus 101' in FIGS. 12-14.

Figure 10:
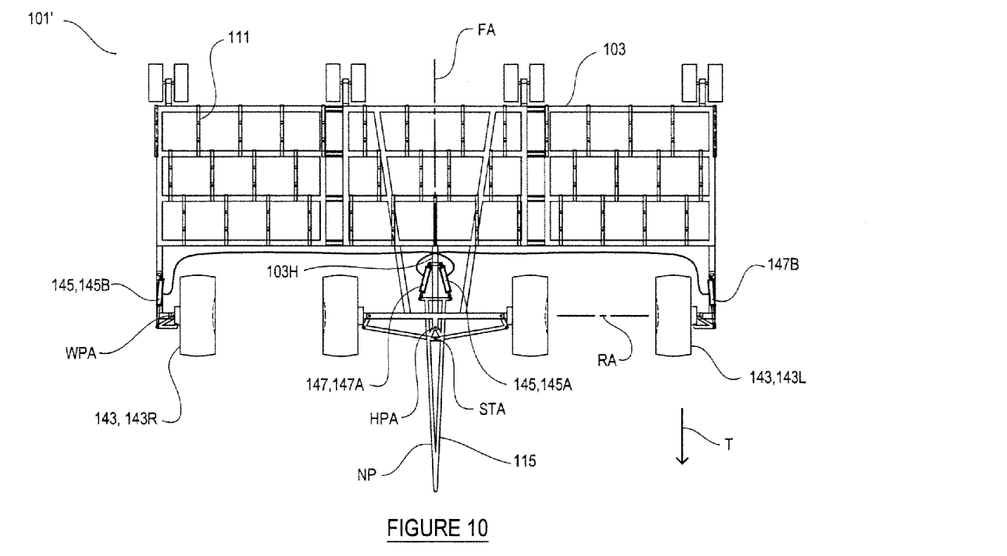
FIG. 10 is a top view of the embodiment of FIG. 5 with the outboard castering front wheels replaced by much larger outboard front wheels with a controlled rolling orientation.

The controlled outboard front wheels 143 are mounted to the frame 103 about substantially vertical wheel pivot axes WPA, and a control linkage connects the right and left controlled outboard front wheels 143 to the hitch tongue 115 such that moving the hitch tongue 115 away from the neutral position NP in a selected direction turns the controlled outboard front wheels 143 in the selected direction. In the illustrated apparatus 101', the rotational axes RA of the front flotation wheels 109 and the controlled outboard front wheels 143 are substantially aligned when the wheels 109, 143 are oriented to roll in the operating travel direction T as shown in FIG. 10. Thus the central and outer portions of the front of the frame 103 are supported along the aligned rotational axes RA, and the separation distance between the outboard front wheels 143 and the rear wheels 105 is increased somewhat to provide the larger diameter flotation wheels 143.

Figure 11:
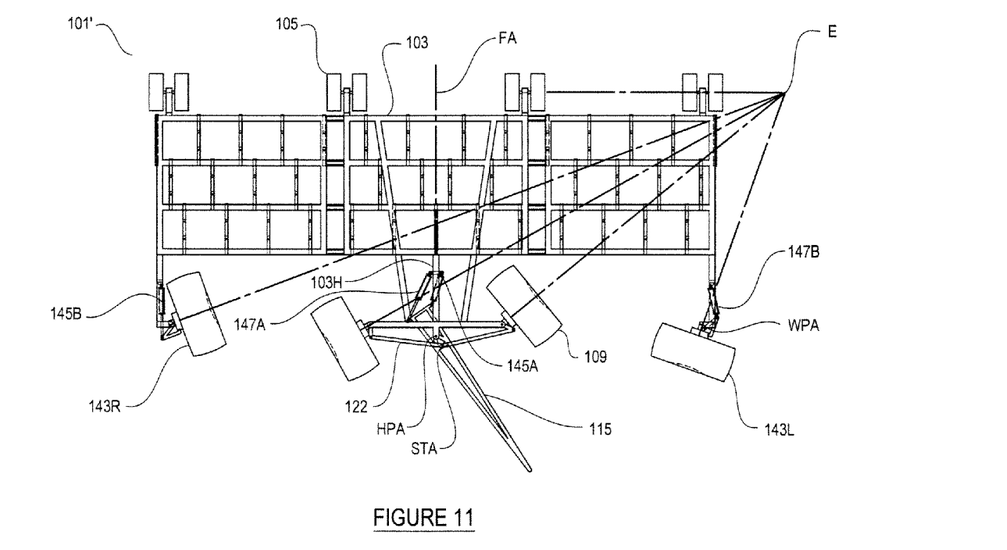
FIG. 11 is a top view of the embodiment of FIG. 10 with the hitch tongue in a leftward turning position, and the flotation front wheels and controlled flotation outboard front wheels oriented to roll to the left.
Figure 12:
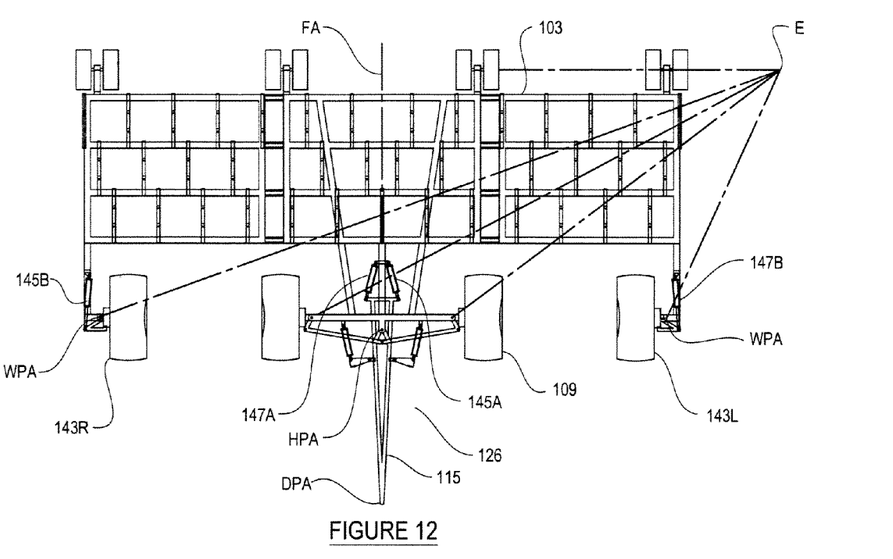
FIG. 12 is a top view of the embodiment of FIG. 10 with a pivot restraint mechanism installed and in the release position and with the hitch tongue in the neutral position and the controlled flotation front wheels and controlled flotation outboard front wheels oriented to roll in the operating travel direction.
Figure 13:
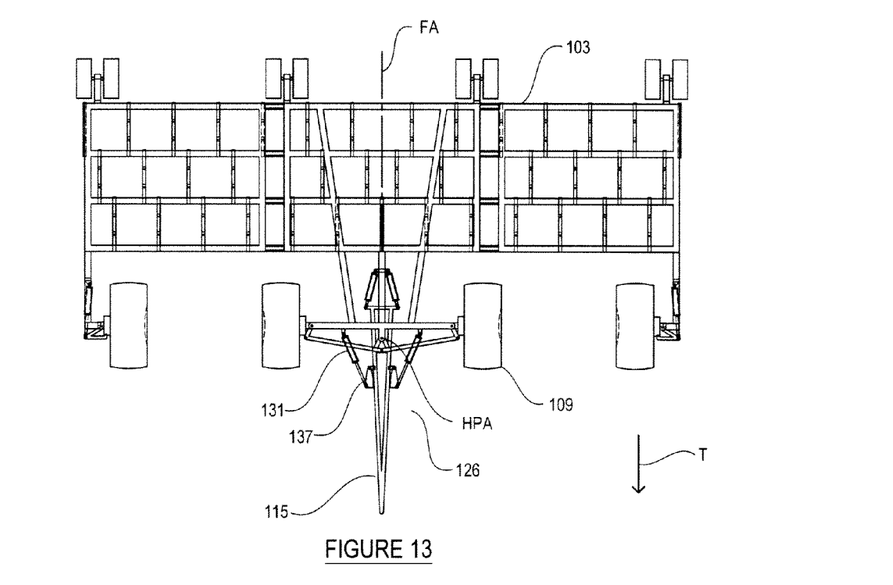
FIG. 13 is a top view of the embodiment of FIG. 10 with the pivot restraint mechanism in the restraint position with the hitch tongue in the neutral position.
Figure 14:
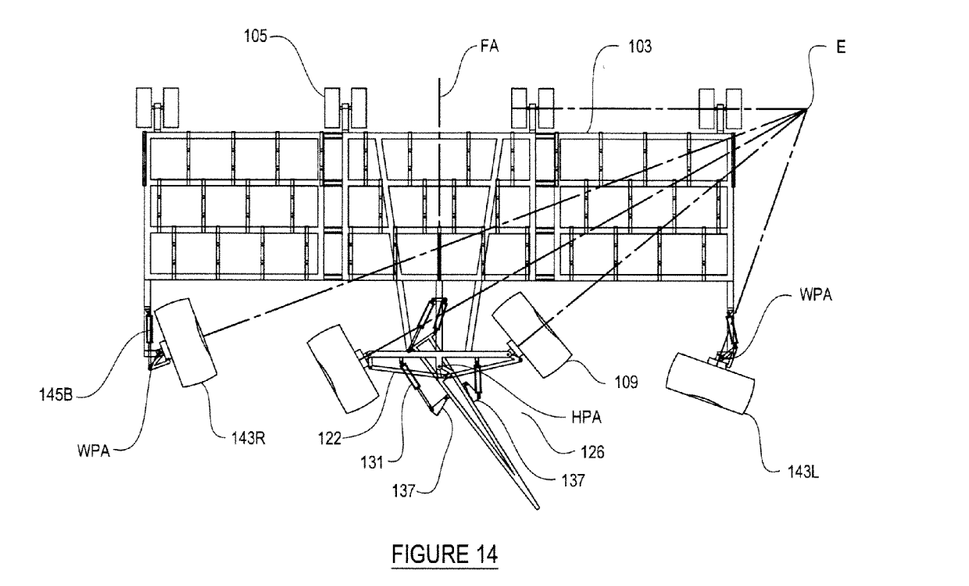
FIG. 14 is a top view of the embodiment of FIG. 10 with the pivot restraint mechanism in the release position and with the hitch tongue in a leftward turning position and the controlled flotation front wheels and controlled flotation outboard front wheels oriented to roll to the left.

To provide a smooth turn, the control linkage is configured such that moving the hitch tongue 115 to a selected maximum degree from the neutral position, as illustrated in FIG. 11, pivots the right and left controlled front flotation wheels 109 and the right and left controlled outboard front wheels 143 about their respective vertical wheel pivot axes WPA such that rotational axes RA of the right and left front flotation wheels 109 and the right and left controlled outboard front wheels 143 intersect generally at a desired turning axis E. FIGS. 7 and 9 show a similarly located turning axis E, where the outboard front wheels are castering wheels 107 pivoting about vertical caster axes CA.

In the illustrated apparatus 101', the control linkage for the controlled outboard front wheels 143 comprises a right pair of control hydraulic cylinders 145 comprising a first hydraulic cylinder 145A connected to the hitch tongue 115 and to the frame 103 at the forward extending hitch section 103H thereof, and a second hydraulic cylinder 145B connected to the frame 103 and to the right controlled outboard front wheel 143R. Chambers of the first and second hydraulic cylinders 145A, 145B are connected or slaved such that movement of the hitch tongue 115 away from the neutral position NP of FIG. 10 toward the turned position of FIG. 11 moves hydraulic fluid from the first hydraulic cylinder 145A into the second hydraulic cylinder 145B to pivot the right controlled outboard front wheel 143R and pivot same in the direction moved by the hitch tongue 15.

The hitch tongue 115 extends rearward of the hitch pivot axis HPA and the first hydraulic cylinder 145A of the right pair of control hydraulic cylinders 145 is connected to the hitch tongue 115 rearward of the hitch pivot axis HPA and on the side of the hitch tongue 115 opposite the right controlled outboard front wheel 143R. Thus as can be seen in figures, when the hitch tongue moves to the left as in FIG. 11, the first hydraulic cylinder 145A retracts and hydraulic fluid is pushed into the second hydraulic cylinder 145B which extends and turns the right controlled outboard front wheel 143R to the left.

In the same manner a left pair of control hydraulic cylinders 147 comprises a first hydraulic cylinder 147A connected to the hitch tongue 115 rearward of the hitch pivot axis HPA and to the frame 103, and a second hydraulic cylinder 147B connected to the frame 103 and to the left controlled outboard front wheel 143L, wherein chambers of the first and second hydraulic cylinders 147A, 147B are connected such that movement of the hitch tongue 115 away from the neutral position NP moves hydraulic fluid from the first hydraulic cylinder 147A into the second hydraulic cylinder 147B to turn the left controlled outboard front wheel 143L in the direction moved by the hitch tongue 115.

The disclosed devices thus provide controlled pivoting and turning of the front wheels of an agricultural implement that allows for the use of substantially larger diameter front wheels to increase flotation support and reduce the tendency of the front end of such implements to sink into soft soil, thus allowing the implement to operate on soft soil where the wheels of conventional implements would sink and the implement would be stuck and unable to work. Increased flotation also improves depth control, decreases draft, and reduces ruts that adversely affect subsequent field operations such as harvesting. Controlled pivoting of the front wheels also reduces stresses on the implement during turns.

The disclosed devices thus provide a method of controlling the rolling orientation of at least one front flotation wheels of an agricultural implement 1. The method comprises supporting a frame on front and rear wheels 5, 7, 9 for movement along the ground in an operating travel direction T, and mounting a plurality of ground engaging tools 11 on the frame 3; pivotally mounting front flotation wheels 9 to the frame 3 about vertical wheel pivot axes WP; pivotally attaching a hitch tongue 15 to a mid-point of a width of the frame 3 about a substantially vertical hitch pivot axis HPA, and pivotally attaching a front end of the hitch tongue 15 to a to tow vehicle drawbar 17 with a substantially vertical drawbar pin 19; connecting the front flotation wheels 9 to the hitch tongue 15 with a wheel control mechanism comprising control arms 22 or control hydraulic cylinders 24 configured such that when the hitch tongue 15 is in a neutral position NP the front flotation wheels 9 are oriented to roll in the operating travel direction T; operating the tow vehicle to tow the frame 3 along a field surface with the ground engaging tools 11 penetrating the field surface.

The method can further comprise, as illustrated in FIGS. 7-9, operating the tow vehicle to tow the frame 103 along the field surface in a substantially straight line with the hitch tongue 115 secured in the neutral position NP about the hitch pivot axis HPA, the neutral position NP selected to place the hitch tongue 115 in a desired operating orientation with respect to the frame 103; and releasing the hitch tongue 15 from the neutral position NP and turning the tow vehicle such that the hitch tongue 115 pivots about the hitch pivot axis HPA and moves the wheel control mechanism 126 to pivot the front flotation wheels 109 about the wheel pivot axes WPA and turn the frame 103 in the same direction as the tow vehicle.

The method can further comprise exerting a bias force BF on the hitch tongue 115 resisting movement of the hitch tongue 115 away from the neutral position NP, the bias force BF selected such that when operating the tow vehicle to tow the frame 103 in a substantially straight line along a field surface with the ground engaging tools 111 penetrating the field surface the hitch tongue 115 is secured in the neutral position NP, and when the tow vehicle is turned the hitch tongue 115 pivots about the hitch pivot axis HPA against the bias force BF. The bias force BF is exerted by a pivot restraint mechanism 126 when the pivot restraint mechanism 126 is in a restraint mode, and no bias force is exerted on the hitch tongue 115 when the pivot restraint mechanism 126 is in a release mode. The pivot restraint mechanism 126 is operated in the restraint mode when turns are in a first shallow range of turn degree, and the pivot restraint mechanism is operated in the release mode when turns are in a second sharp range of turn degree.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural implement apparatus comprising:
 a frame supported on rear wheels and right and left flotation front wheels for movement along the ground in an operating travel direction, and a plurality of ground engaging tools mounted on the frame substantially equally on each side of a frame axis extending parallel to the operating travel direction;
 wherein the right and left flotation front wheels are pivotally mounted to the frame about corresponding substantially vertical right and left wheel pivot axes;
 a hitch tongue having a rear end pivotally attached to a lateral mid-point of the frame about a substantially vertical hitch pivot axis located substantially on the frame axis, and having a front end adapted for pivotal attachment to a drawbar of a towing vehicle by a substantially vertical drawbar pin;
 a wheel control mechanism connecting the right and left flotation front wheels to the hitch tongue such that pivotal movement of the right and left flotation front wheels about the corresponding right and left wheel pivot axes follows pivotal movement of the hitch tongue about the hitch pivot axis;
 the wheel control mechanism configured such that when the hitch tongue is in a neutral position aligned with the frame axis, the right and left flotation front wheels are oriented to roll in the operating travel direction, and pivoting the hitch tongue about the hitch pivot axis away from the neutral position causes the right and left flotation front wheels to pivot about the corresponding right and left wheel pivot axes; and
 right and left flotation outboard front wheels mounted to the frame about substantially vertical wheel pivot axes, and a control linkage connecting the right and left flotation outboard front wheels to the hitch tongue such that moving the hitch tongue away from the neutral position in a selected direction turns the flotation outboard front wheels in the selected direction.

2. The apparatus of claim 1 wherein moving the hitch tongue to a selected maximum degree from the neutral position pivots the right and left flotation front wheels and the right and left flotation outboard front wheels about their respective vertical wheel pivot axes such that rotational axes of the right and left flotation front wheels and the right and left flotation outboard front wheels intersect at a desired turning axis.

3. The apparatus of claim 2 wherein the desired turning axis is located outside the frame.

4. The apparatus of claim 1 comprising a right pair of control hydraulic cylinders comprising a first hydraulic cylinder connected to the hitch tongue and to the frame, and a second hydraulic cylinder connected to the frame and to the right flotation outboard front wheel, wherein chambers of the first and second hydraulic cylinders are connected such that movement of the hitch tongue away from the neutral position moves hydraulic fluid from the first hydraulic cylinder into the second hydraulic cylinder to turn the right flotation outboard front wheel in the direction moved by the hitch tongue.

5. The apparatus of claim 4 wherein the hitch tongue extends rearward of the hitch pivot axis and the first hydraulic cylinder of the right pair of control hydraulic cylinders is connected to the hitch tongue rearward of the hitch pivot axis.

6. The apparatus of claim 4 comprising a left pair of control hydraulic cylinders comprising a first hydraulic cylinder connected to the hitch tongue and to the frame, and a second hydraulic cylinder connected to the frame and to the left flotation outboard front wheel, wherein chambers of the first and second hydraulic cylinders are connected such that movement of the hitch tongue away from the neutral position moves hydraulic fluid from the first hydraulic cylinder into the second hydraulic cylinder to turn the left flotation outboard front wheel in the direction moved by the hitch tongue, and wherein the first hydraulic cylinder of the left pair of control hydraulic cylinders is connected to the hitch tongue rearward of the hitch pivot axis.

\* \* \* \* \*